US007647565B2

(12) United States Patent
Hayes, Jr. et al.

(10) Patent No.: US 7,647,565 B2
(45) Date of Patent: Jan. 12, 2010

(54) METHOD, APPARATUS, AND COMPUTER PROGRAM PRODUCT FOR AN ENHANCED MOUSE POINTER

(75) Inventors: Kent Fillmore Hayes, Jr., Chapel Hill, NC (US); Steven P. Kim, Raleigh, NC (US); Oludare Adebankole Kumolu-Johnson, Cary, NC (US); Robert Thomas Uthe, Morrisville, NC (US)

(73) Assignee: International Business Machines Coporation, Armonk, NY (US)

( * ) Notice: Subject to any disclaimer, the term of this patent is extended or adjusted under 35 U.S.C. 154(b) by 580 days.

(21) Appl. No.: 11/059,722

(22) Filed: Feb. 16, 2005

(65) Prior Publication Data

US 2006/0184902 A1    Aug. 17, 2006

(51) Int. Cl.
*G06F 3/00* (2006.01)
*G06F 9/00* (2006.01)
*G06F 17/00* (2006.01)
(52) U.S. Cl. .................... 715/861; 715/856; 715/858
(58) Field of Classification Search ............... 345/163, 345/167; 715/861, 858, 856
See application file for complete search history.

(56) References Cited

U.S. PATENT DOCUMENTS

| 4,677,561 A | 6/1987 | Akama et al. |
| 4,847,605 A | 7/1989 | Callahan et al. ............. 340/709 |
| 4,987,411 A | 1/1991 | Ishigami ..................... 340/709 |
| 5,452,212 A | 9/1995 | Yokoyama et al. |
| 5,508,717 A | 4/1996 | Miller ........................ 345/145 |
| 5,510,811 A | 4/1996 | Tobey et al. ................. 345/157 |
| 5,565,888 A | 10/1996 | Selker ........................ 345/146 |
| 5,638,279 A | 6/1997 | Kishi et al. |
| 5,754,430 A | 5/1998 | Sawada |
| 5,808,601 A | 9/1998 | Leah et al. .................. 345/145 |

(Continued)

FOREIGN PATENT DOCUMENTS

EP    0170725 A1    2/1986

(Continued)

OTHER PUBLICATIONS

"Methodology for Marking Objects Using a Polar Coordinate Point and Shoot Cursor", IBM Technical Disclosure Bulletin, vol. 35, No. 6, Nov. 1992, pp. 310-311.

(Continued)

*Primary Examiner*—Kieu Vu
*Assistant Examiner*—Sabrina Greene
(74) *Attorney, Agent, or Firm*—Hoffman & Warnick LLP

(57) ABSTRACT

A method, apparatus, and computer program product are disclosed for selecting links in a page using an enhanced mouse pointer. The page is displayed in a data processing system that includes a mouse that includes a scroll wheel. Multiple links are included in the page. A standard mouse pointer is displayed in the page. An enhanced mouse pointer state is then invoked causing the standard mouse pointer to become an enhanced mouse pointer. In response to invoking the enhanced mouse pointer state, a closest one of the links in the page to the enhanced standard mouse pointer is determined. An enhanced mouse pointer indicator is displayed that extends from the enhanced mouse pointer to the determined closest one of the links. The links may be scrolled through by rotating the scroll wheel.

30 Claims, 11 Drawing Sheets

U.S. PATENT DOCUMENTS

| | | | |
|---|---|---|---|
| 5,808,604 A | 9/1998 | Robin | 345/146 |
| 5,874,905 A | 2/1999 | Nanba et al. | |
| 6,046,722 A | 4/2000 | McKiel, Jr. | 345/145 |
| 6,075,531 A | 6/2000 | DeStefano | 345/340 |
| 6,121,900 A | 9/2000 | Takishita | |
| 6,178,380 B1 | 1/2001 | Millington | |
| 6,234,106 B1 | 5/2001 | Dohnal et al. | |
| 6,259,432 B1 | 7/2001 | Yamada et al. | |
| 6,518,987 B1 | 2/2003 | Crevasse et al. | 345/810 |
| 6,597,383 B1 | 7/2003 | Saito | 345/860 |
| 6,611,753 B1 | 8/2003 | Millington | |
| 6,670,910 B2 | 12/2003 | Delcheccolo et al. | |
| 6,677,965 B1 | 1/2004 | Ullmann et al. | 345/786 |
| 6,717,600 B2 | 4/2004 | Dutta et al. | 345/862 |
| 6,771,189 B2 | 8/2004 | Yokota | |
| 6,801,231 B1 | 10/2004 | Beltz | 345/865 |
| 6,873,905 B2 | 3/2005 | Endo et al. | |
| 7,071,919 B2 * | 7/2006 | Hinckley et al. | 345/163 |
| 7,100,123 B1 * | 8/2006 | Todd et al. | 715/862 |
| 2001/0030668 A1 * | 10/2001 | Erten et al. | 345/863 |
| 2001/0034238 A1 | 10/2001 | Voyer | |
| 2003/0018427 A1 | 1/2003 | Yokota et al. | |
| 2005/0091604 A1 | 4/2005 | Davis | |
| 2005/0091640 A1 | 4/2005 | McCollum et al. | |
| 2005/0183031 A1 | 8/2005 | Onslow | |

FOREIGN PATENT DOCUMENTS

| | | |
|---|---|---|
| EP | 0684451 A1 | 11/1995 |
| EP | 1273885 A2 | 1/2003 |
| JP | 05-298023 | 11/1993 |
| JP | 2003123200 A | 4/2003 |
| JP | 2003312415 A | 6/2003 |
| WO | 2004083767 A2 | 9/2004 |

OTHER PUBLICATIONS

Toyota Motor Corporation, "Lexus Navigation System-Owner's Manual-RX330", Publication No. OM48493U, Copyright 2004, 33 pages.

USPTO, Office Action, Mail Date Aug. 22, 2007, U.S. Appl. No. 11/113,798, filed Apr. 25, 2005.

USPTO, Office Action, Mail Date Feb. 25, 2008, U.S. Appl. No. 11/113,798, filed Apr. 25, 2005.

USPTO, Office Action, Mail Date Jun. 20, 2008, U.S. Appl. No. 11/113,798, filed Apr. 25, 2005.

USPTO, Final Office Action, Notification Date Oct. 17, 2008, U.S. Appl. No. 11/113,798, filed Apr. 25, 2005.

USPTO, Office Action, Notification Date Mar. 20, 2009, U.S. Appl. No. 11/113,798, filed Apr. 25, 2005.

* cited by examiner

METHOD, APPARATUS, AND COMPUTER PROGRAM PRODUCT FOR AN ENHANCED MOUSE POINTER

BACKGROUND OF THE INVENTION

1. Technical Field

The present invention is directed to the field of data processing systems and more particularly to a data processing system input device that permits a user to select links that are included within a displayed graphical user input page without requiring the user to physically move the input device around a surface on which the mouse rests.

2. Description of Related Art

Currently, when reading a web page, a user is presented with a multitude of sections to read as well as URL links to use to visit other web pages. Navigation within a web page, however, can be complicated given the current set of tools that are available for use for viewing information.

Scrollbars placed within a web browser allow users to view information either from a vertical or horizontal direction of the web page. However, users cannot directly access links through the use of keyboard commands or by using the mouse without physically moving the mouse about the desktop or tabbing around the entire web page. For example, a user must move the mouse around the surface on which the mouse rests in order to cause the mouse pointer to move to a particular link so that the user can select that link.

In addition, if the user wants to simply scroll to a particular section of a web page, the user would need to use either the page up/down buttons or the scroll bar within the browser.

For users suffering from a disability, such as a mobility handicap, navigation to a specific section within a web page by moving the mouse pointer to a desired link is difficult. These tasks may not be possible to such users because the user may not be able to move the keyboard or mouse in the required manner.

Therefore, a need exists for a method, apparatus, and computer program product that provides an enhanced mouse pointer that permits a user to select a displayed URL link or scroll through links while the mouse remains stationary on the surface on which the mouse rests.

BRIEF SUMMARY OF THE INVENTION

A method, apparatus, and computer program product are disclosed for selecting links in a page using an enhanced mouse pointer. The page is displayed in a data processing system that includes a mouse that includes a scroll wheel. Multiple links are included in the page. A standard mouse pointer is displayed in the page. An enhanced mouse pointer state is then invoked causing the standard mouse pointer to become an enhanced mouse pointer. In response to invoking the enhanced mouse pointer state, a closest one of the links in the page to the enhanced standard mouse pointer is determined. An enhanced mouse pointer indicator is displayed that extends from the enhanced mouse pointer to the determined closest one of the links. The links may be scrolled through by rotating the scroll wheel.

The above as well as additional objectives, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
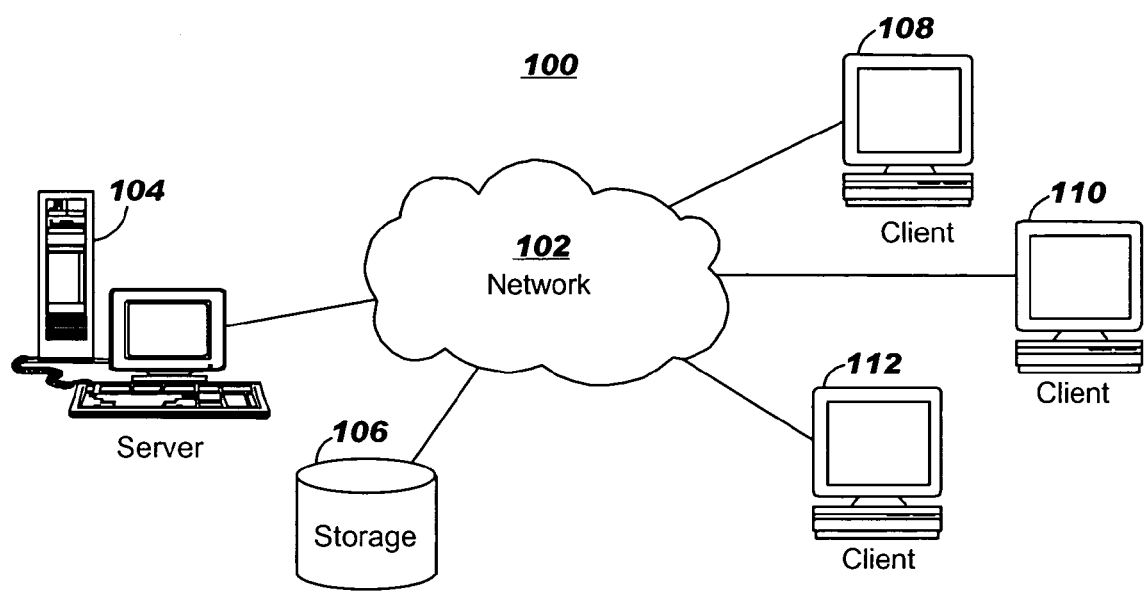
FIG. 1 is a pictorial representation of a network of data processing systems which includes the present invention in accordance with the present invention.

A preferred embodiment of the present invention and its advantages are better understood by referring to the figures, like numerals being used for like and corresponding parts of the accompanying figures.

The present invention is a method, system, and computer program product that provides an enhanced mouse pointer that permits a user to select a link or scroll through links without physically moving the mouse. The links that are included in the web page can be scrolled through while the mouse remains stationary on the desk surface on which the mouse rests.

Upon loading a web page into a web browser, the contents of the web page are scanned to identify all valid links and section headers. Preferably, Javascript is used to perform the scan. When using a mouse, a user may move the mouse pointer within the viewable area of the web browser. The user may then activate the enhanced mouse pointer using one or more mouse buttons. For example, according to the preferred embodiment, the enhanced mouse pointer state is activated by depressing the left mouse button continuously for five seconds. Once the enhanced mouse pointer state is activated, the mouse pointer itself will remain stationary on the web page at the point it was located when the enhanced mouse pointer state was activated. The enhanced mouse pointer remains stationary until the user exits the enhanced mouse pointer state. The enhanced mouse pointer remains stationary even if the mouse itself is moved on the surface of the desk.

Once the enhanced mouse pointer is activated, the enhanced mouse pointer will include an enhanced mouse pointer indicator such as a line drawn from the tip of the mouse pointer to the closest link in the web page. The closest link, pointed to by the enhanced mouse pointer line, is then highlighted. The user may then scroll through all links in the page by rotating the scroll wheel included in the mouse.

The scroll wheel may be rotated from 0 to 360 degrees. As the scroll wheel is rotated, the end of the line that extends from the tip of the enhanced pointer will be moved from one link to another. This is described in more detail with reference to FIGS. 3-9. As depicted by FIGS. 3-9, as the user rotates the scroll wheel forward one predetermined amount at a time, the tip 317 of the line will advance from one link to the next pointing to one link after the other. The length of the line will vary according to the distance from the tip of the enhanced mouse pointer to the next closest link.

If the user wishes to advance in the positive direction just one link at a time, the user may rotate the scroll wheel forward a predetermined amount. If the user rotates the scroll wheel more than the predetermined amount forward, the tip of the line will move further forward through more than one link advancing multiple links at a time.

If the user wishes to move back in the negative direction, the user may rotate the scroll wheel backward the predetermined amount. If the user rotates the scroll wheel more than the predetermined amount backward, the tip of the line will move further backward through more than one link going back multiple links at a time.

Instead of just moving the tip 317 from one link to the next as the scroll wheel is rotated, the line may be redrawn each time the scroll wheel is rotated. When the scroll wheel is rotated, the old line is deleted and a new line is drawn to the next closest link in the web page causing that link to be highlighted. This process may continue with the user using the scroll wheel to highlight one link at time as the scroll wheel is gradually moved or rotated. The links are highlighted according to their x,y coordinates in the web page with the closest links being highlighted first in a radial fashion as the enhanced mouse pointer line is rotated through the web page.

The rotation of the enhanced mouse pointer line, as well as the location of the mouse pointer, determines the vantage point of a link to be selected. For example, the enhanced mouse pointer line can be rotated at any location between 0 and 360 degrees by rotating the scroll wheel between 0 and 360 degrees. For each rotation of the scroll wheel the predetermined amount, the enhanced mouse pointer line will rotate causing the next closest link to be highlighted. Once a link is highlighted, the user may click the right mouse button which simulates the standard behavior of the mouse in order to select the highlighted link. Once the line is pointing to the link that the user desires, the user may select the link by depressing the right mouse button. This mouse event is then intercepted and forwarded to the web browser so that the web page associated with the selected link will be displayed.

The present invention also provides for a search box that may accompany the enhanced mouse pointer. This search box permits a user to enter particular text. Once the user enters the desired text and selects "enter", the present invention analyzes each link in the web page to identify any and all links that include the text. A separate enhanced mouse pointer line will then be displayed, one to each identified link. The line that is drawn to the first identified link will be bolded. Thus, if there are multiple links that include the text, multiple enhanced pointer lines will be simultaneously displayed. Only one enhanced mouse pointer line can be associated with a right mouse button click. Therefore, when the user selects a link, the link that is pointed to using the bold line will be highlighted and selected.

The present invention permits the same functionality using the keyboard. The numeric keypad can be used to move the mouse pointer around within the viewable area of the web page. The standard numeric values, 1-9, will be used to move the mouse pointer. The "/" and "*" keys can act as the scroll key. When a user presses the "/" key, the enhanced mouse pointer line will rotate to the left. The "*" key will rotate the enhanced mouse pointer line to the right. In either case, upon rotation of the enhanced mouse pointer line, the next traversable link or section will be highlighted.

The phrase "enhanced mouse pointer" is used throughout. Those skilled in the art will recognize that the term "cursor" may be used instead of "pointer".

FIG. 1 is a pictorial representation of a network 100 of data processing systems in which the present invention may be implemented. Data processing system network includes a network 102 which is the medium used to provide communications links between various devices and computers connected together within data processing system network 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers, network computers, or other computing devices. In the depicted example, server 104 provides data, such as boot files, operating system images, and applications to clients 108-112. Clients 108, 110, and 112 are clients to server 104. Data processing system network 100 may include additional servers, clients, and other devices not shown. In the depicted example, data processing system network 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

Of course, network data processing system 100 also may be implemented as a number of different types of networks, such as for example, an intranet, a local area network (LAN), a wide area network (WAN), or a wireless network. FIG. 1 is intended as an example, and not as an architectural limitation for the present invention.

Figure 2:
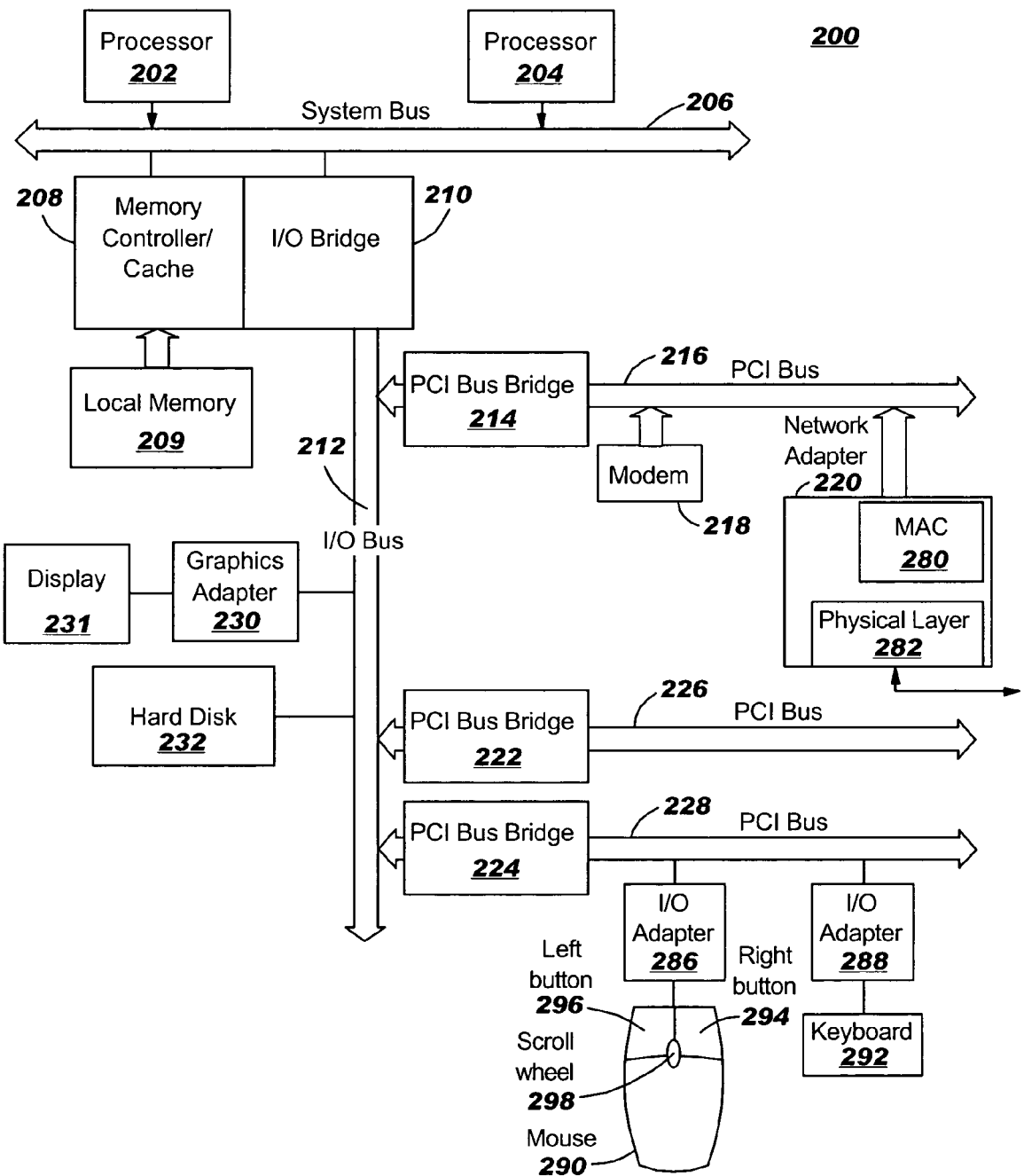
FIG. 2 is a more detailed illustration of a computer system that may be used to implement any of the computer systems of FIG. 1 in accordance with the present invention.

FIG. 2 is a more detailed illustration of a computer system that may be used to implement any of the computer systems of FIG. 1 in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example an Ethernet network over an R45 connector. A media access controller (MAC) 280 is included within network adapter 220. Media access controller (MAC) 280 is coupled to bus 216 and processes digital network signals.

Additional PCI bus bridges 222 and 224 provide interfaces for additional PCI buses 226 and 228, from which additional modems or network adapters may be supported. In this manner, data processing system 200 allows connections to multiple network computers.

An I/O adapter 286 and an I/O adapter 288 are coupled to PCI bus 228. A mouse 290 is coupled to I/O adapter 286. A keyboard 292 is coupled to I/O adapter 288. Mouse 290 includes a right button 294, a left button 296, and a scroll wheel 298.

A memory-mapped graphics adapter 230 and hard disk 232 may also be connected to I/O bus 212 as depicted, either directly or indirectly. A display 231 is coupled to graphics adapter 230. Display 231 may be used to display a web page as described below in which the present invention may be used.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed by one of the computers depicted by FIG. 1 or 2.

Figure 3:
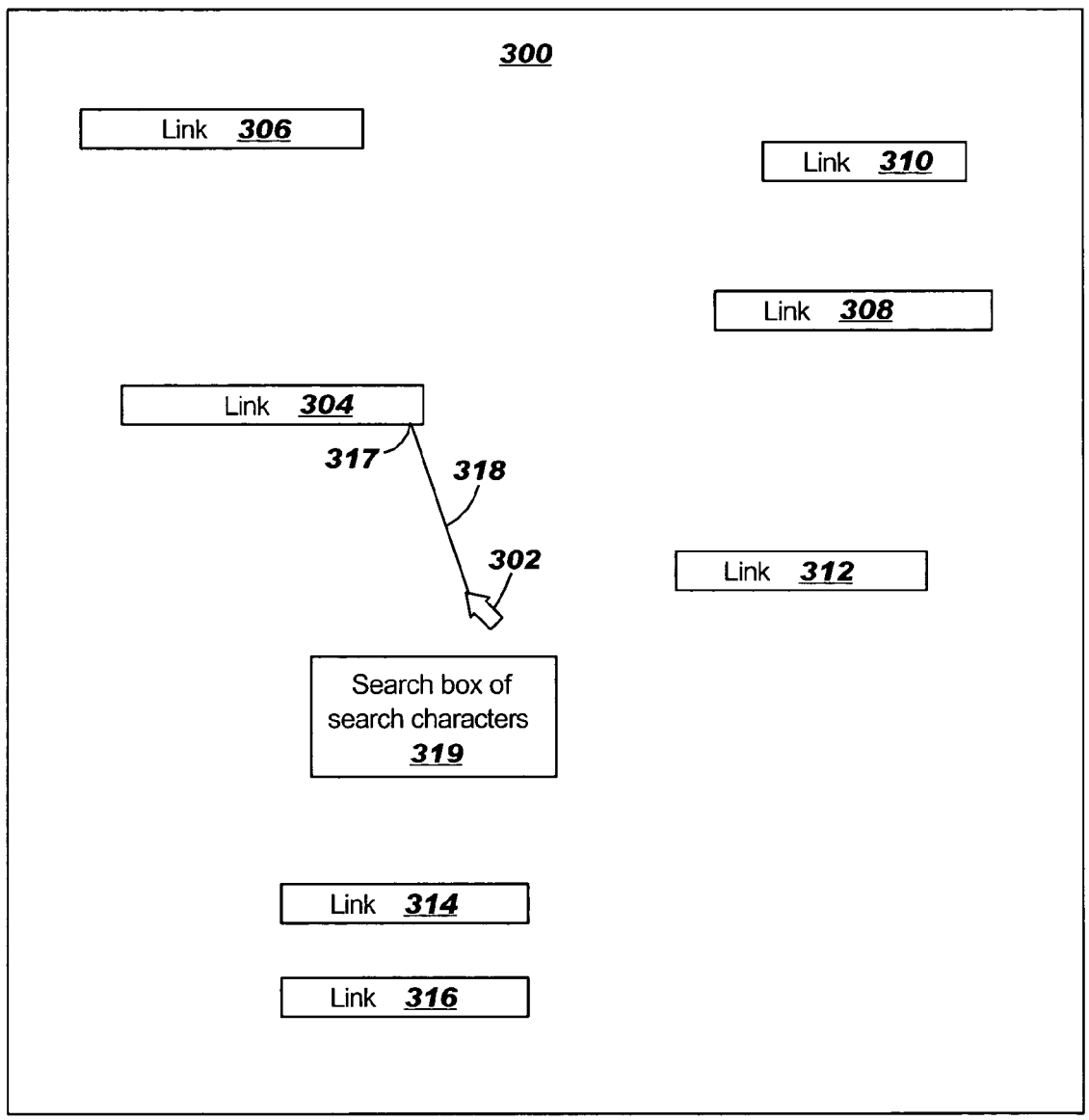
FIG. 3 is a pictorial representation of a web page that includes an enhanced mouse pointer that points to a first link in accordance with the present invention.

FIG. 3 is a pictorial representation of a web page 300 that includes an enhanced mouse pointer 302 that points to a first link 304 in accordance with the present invention. Multiple different links 304, 306, 308, 310, 312, 314, and 316 are displayed simultaneously within web page 300. Each link can be used to route the user from page 300 to another (not shown) location within page 300 or to a location within a different web page. Thus, each link 304, 306, 308, 310, 312, 314, and 316 is associated with a particular destination location.

According to the prior art, in order to traverse from page 300 to a particular destination location, the user was required to physically move the mouse around the surface on which the mouse rests in order to cause the mouse pointer to be moved to the appropriate link. The user could then select that link. The link would then be traversed such that the associated destination location would be displayed.

According to the present invention, when web page 300 is loaded into the user's browser, all possible web links, such as 304, 306, 308, 310, 312, 314, and 316, in the page are identified. The x,y coordinates of each identified link are also determined. The user may then move the standard mouse pointer within page 300 by moving the mouse.

Prior to entering the enhanced mouse pointer state, the mouse pointer may be moved around within web page 300 according to the prior art. According to present invention, a user may utilize the enhanced mouse pointer by entering the enhanced mouse pointer state. At the time the enhanced mouse pointer state is entered, the standard mouse pointer is located at a particular location within web page 300.

The enhanced mouse pointer state may then be entered utilizing any of a number of different methods. The preferred method described herein involves the constant depression of one of mouse buttons, such as the left mouse button, for a predetermined period of time, e.g., five seconds. Once the left mouse button has been constantly depressed for five seconds, the enhanced mouse pointer state is invoked. Once the enhanced mouse pointer state is invoked, the standard mouse pointer becomes the enhanced mouse pointer. The enhanced mouse pointer does not physically move within web page 300 when the mouse is moved, instead, enhanced mouse pointer 302 remains stationary within page 300.

Once the enhanced mouse pointer state is entered, the present invention determines the present location of enhanced mouse pointer 302 within page 300. By comparing the x,y coordinates of pointer 302 with the x,y coordinates determined for each identified link, such as links 304, 306, 308, 310, 312, 314, and 316, the present invention can determine which one of the links in page 302 is physically closest to pointer 302. The present invention then draws a line 318 from the tip of pointer 302 to the closest link.

The present invention also displays a search box 319 for entering search text. The present invention will search within each link to determine whether the search text appears in the link. The process will be described in more detail below.

Once the enhanced mouse pointer state has been entered, the user may scroll through each displayed link 304, 306, 308, 310, 312, 314, and 316 without having to physically move the mouse around the desk surface. Because link 304 was determined to be the link that is physically closest to pointer 302 when the enhanced mouse pointer state was entered, link 304 is the first link highlighted. Line 318 is drawn from enhanced mouse pointer 302 to link 304.

The user may then select the highlighted link in order to traverse through the link. The enhanced mouse pointer state is exiting when the user selects the highlighted link. For example, the user can select the highlighted link, i.e. link 304, which will cause the user to traverse to the destination location associated with link 304.

One method for exiting the enhanced mouse pointer state is to depress the right mouse button. If the user wishes to traverse through the highlighted link, the user merely needs to depress the right mouse button. In this manner, the user has been permitted to highlight, select, and traverse through a link without physically moving the mouse itself.

Instead of selecting the highlighted link, the user can continue to scroll through the other links, i.e. links 306, 308, 310, 312, 314, and 316. The user is permitted to scroll through links 306, 308, 310, 312, 314, and 316 by moving scroll wheel 298 included within mouse 290. The next closest link in a radial direction will be highlighted as the scroll wheel is moved.

Figure 4:
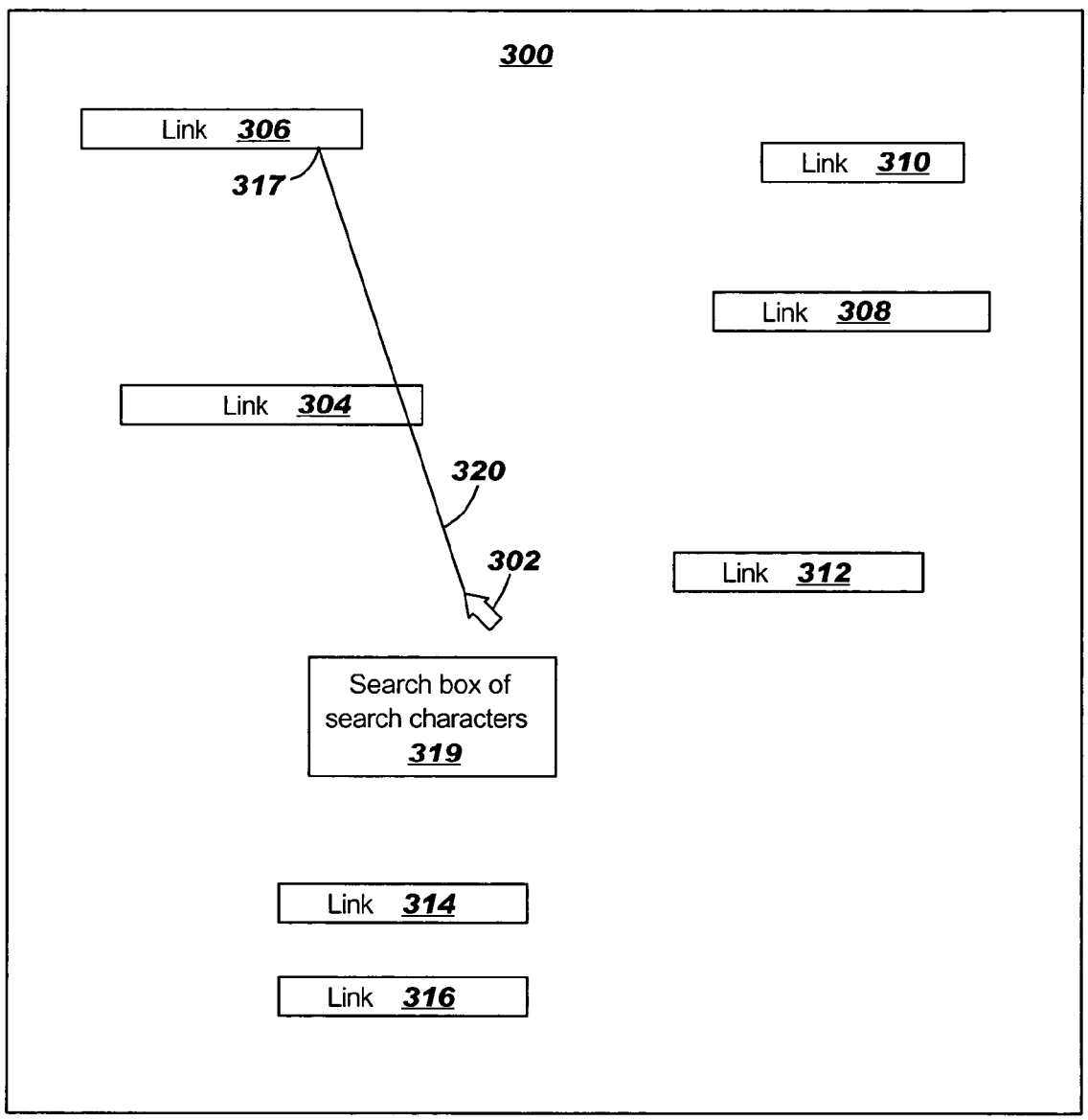
FIG. 4 is a pictorial representation of a web page that includes an enhanced mouse pointer that points to a second link in accordance with the present invention.

For example, FIG. 4 is a pictorial representation of a web page 300 that includes an enhanced mouse pointer 302 that points to a second link 306 in accordance with the present invention. Link 306 was determined to be the next closest link in a radial direction from link 304. Therefore, link 306 is the next link highlighted as the scroll wheel is moved. In addition, a line 320 is drawn from the tip of enhanced mouse pointer 302 to link 306.

Figure 5:
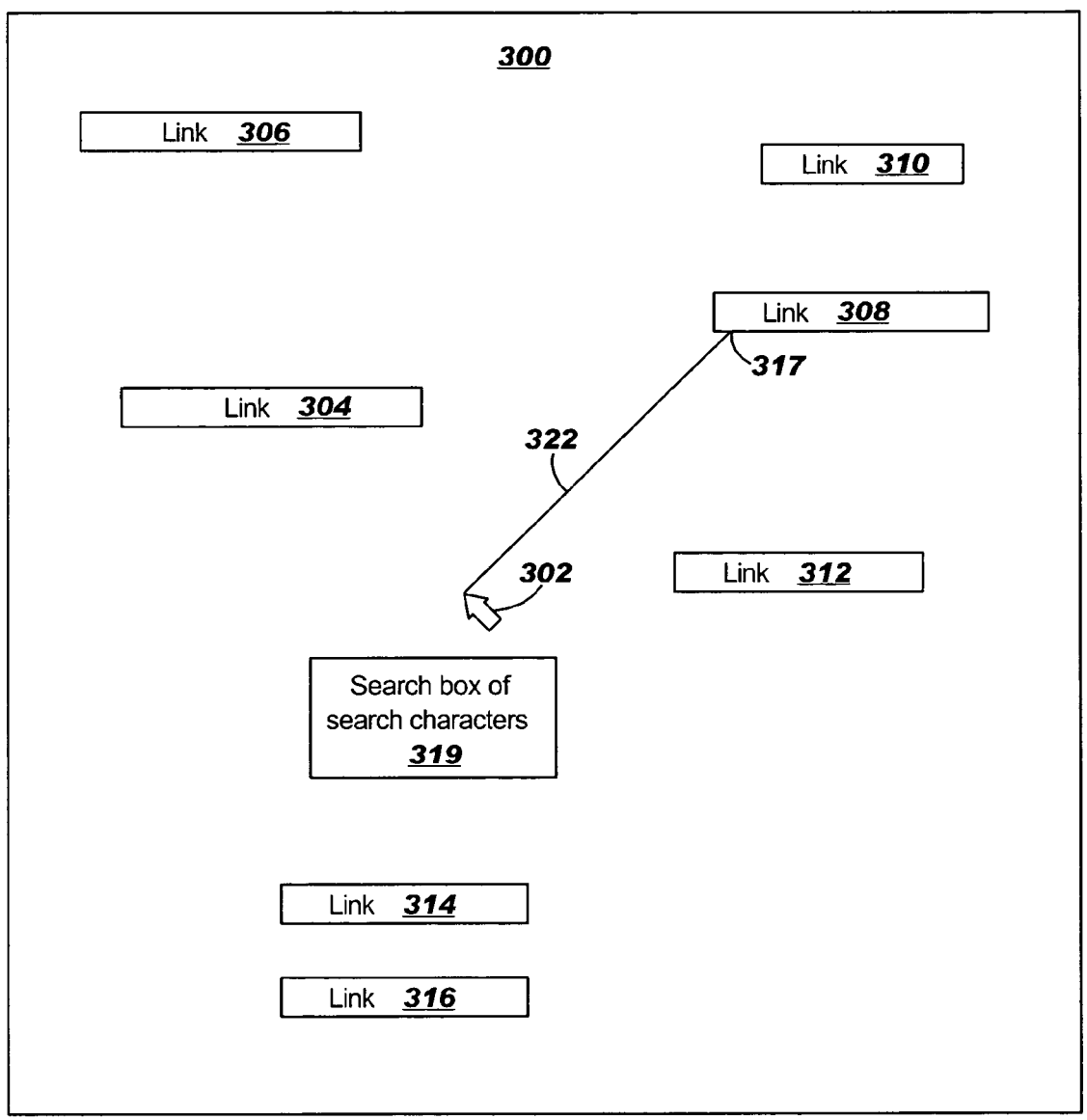
FIG. 5 is a pictorial representation of a web page that includes an enhanced mouse pointer that points to a third link in accordance with the present invention.

If, instead of selecting link 306, the user continues to rotate the scroll wheel, the next closest link in a radial direction from link 306 will be highlighted. For example, FIG. 5 is a pictorial representation of a web page that includes an enhanced mouse pointer that points to a third link 308 in accordance with the present invention. Link 308 was determined to be the next closest link in a radial direction from link 306. Therefore, link 308 is the next link highlighted as the scroll wheel is moved. In addition, a line 322 is drawn from the tip of enhanced mouse pointer 302 to link 308. If, instead of selecting link 308, the user continues to rotate the scroll wheel, the next closest link in a radial direction from link 308 will be highlighted.

Figure 6:
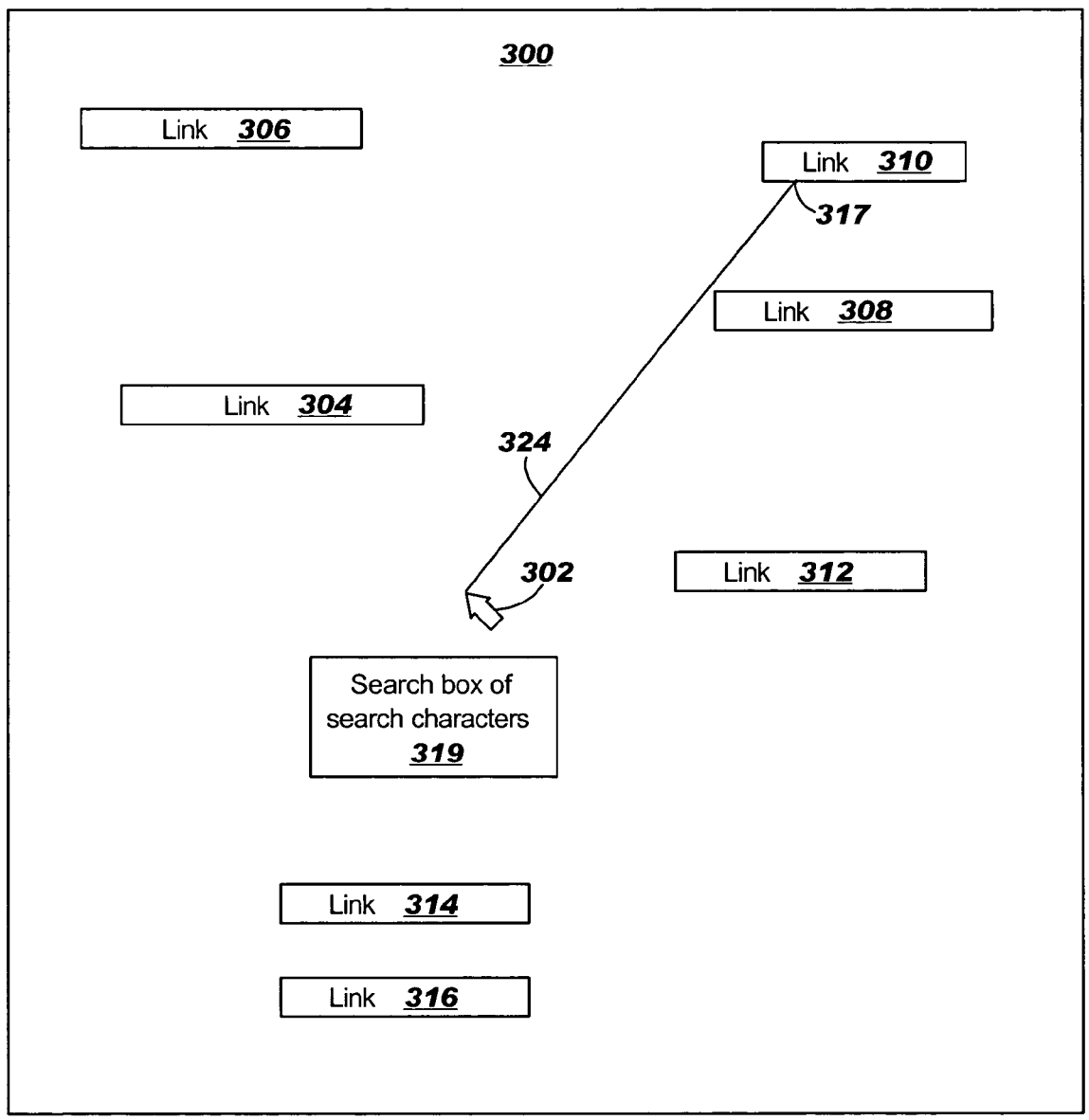
FIG. 6 is a pictorial representation of a web page that includes an enhanced mouse pointer that points to a fourth link in accordance with the present invention.

For example, FIG. 6 is a pictorial representation of a web page that includes an enhanced mouse pointer that points to a fourth link 310 in accordance with the present invention. Link 310 was determined to be the next closest link in a radial direction from link 308. Therefore, link 310 is the next link highlighted as the scroll wheel is moved. In addition, a line 324 is drawn from the tip of enhanced mouse pointer 302 to link 310. If, instead of selecting link 310, the user continues to rotate the scroll wheel, the next closest link in a radial direction from link 310 will be highlighted.

Figure 7:
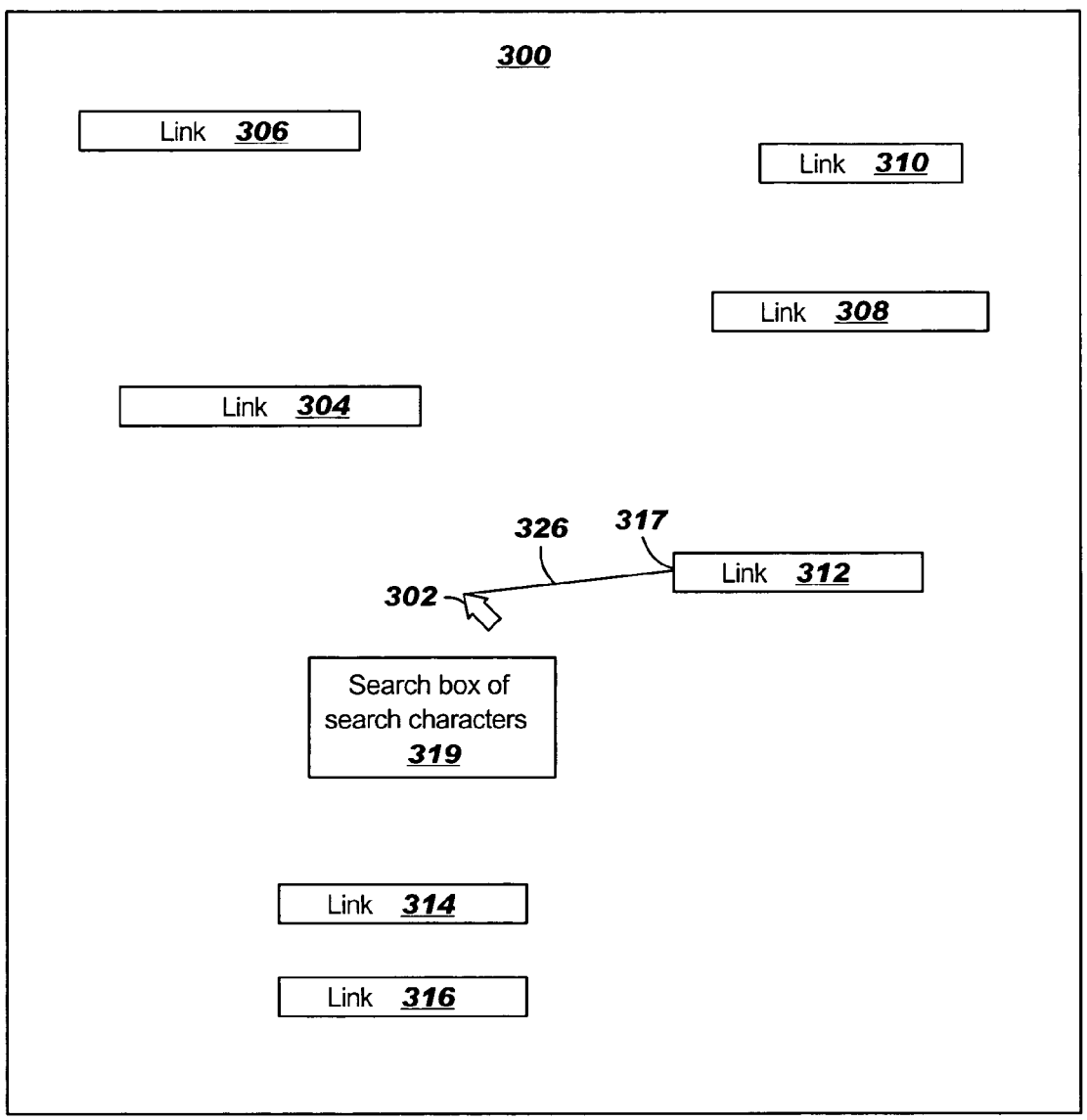
FIG. 7 is a pictorial representation of a web page that includes an enhanced mouse pointer that points to a fifth link in accordance with the present invention.

For example, FIG. 7 is a pictorial representation of a web page that includes an enhanced mouse pointer that points to a fifth link 312 in accordance with the present invention. Link 312 was determined to be the next closest link in a radial direction from link 310. Therefore, link 312 is the next link highlighted as the scroll wheel is moved. In addition, a line 326 is drawn from the tip of enhanced mouse pointer 302 to link 312. If, instead of selecting link 312, the user continues to rotate the scroll wheel, the next closest link in a radial direction from link 312 will be highlighted.

Figure 8:
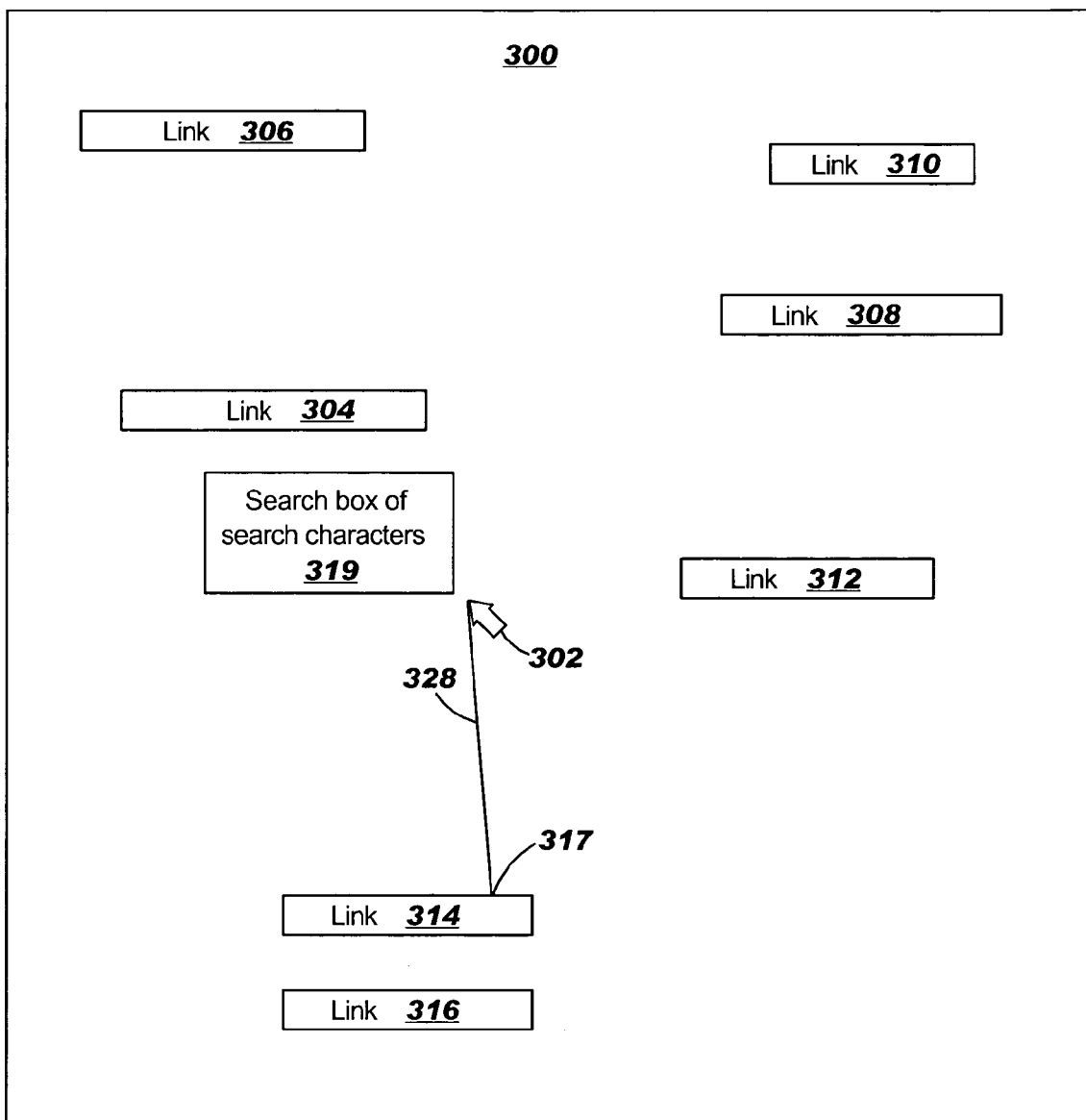
FIG. 8 is a pictorial representation of a web page that includes an enhanced mouse pointer that points to a sixth link in accordance with the present invention.

For example, FIG. 8 is a pictorial representation of a web page that includes an enhanced mouse pointer that points to a sixth link 314 in accordance with the present invention. Link 314 was determined to be the next closest link in a radial direction from link 312. Therefore, link 314 is the next link highlighted as the scroll wheel is moved. In addition, a line 328 is drawn from the tip of enhanced mouse pointer 302 to link 314. If, instead of selecting link 314, the user continues to rotate the scroll wheel, the next closest link in a radial direction from link 314 will be highlighted.

Figure 9:
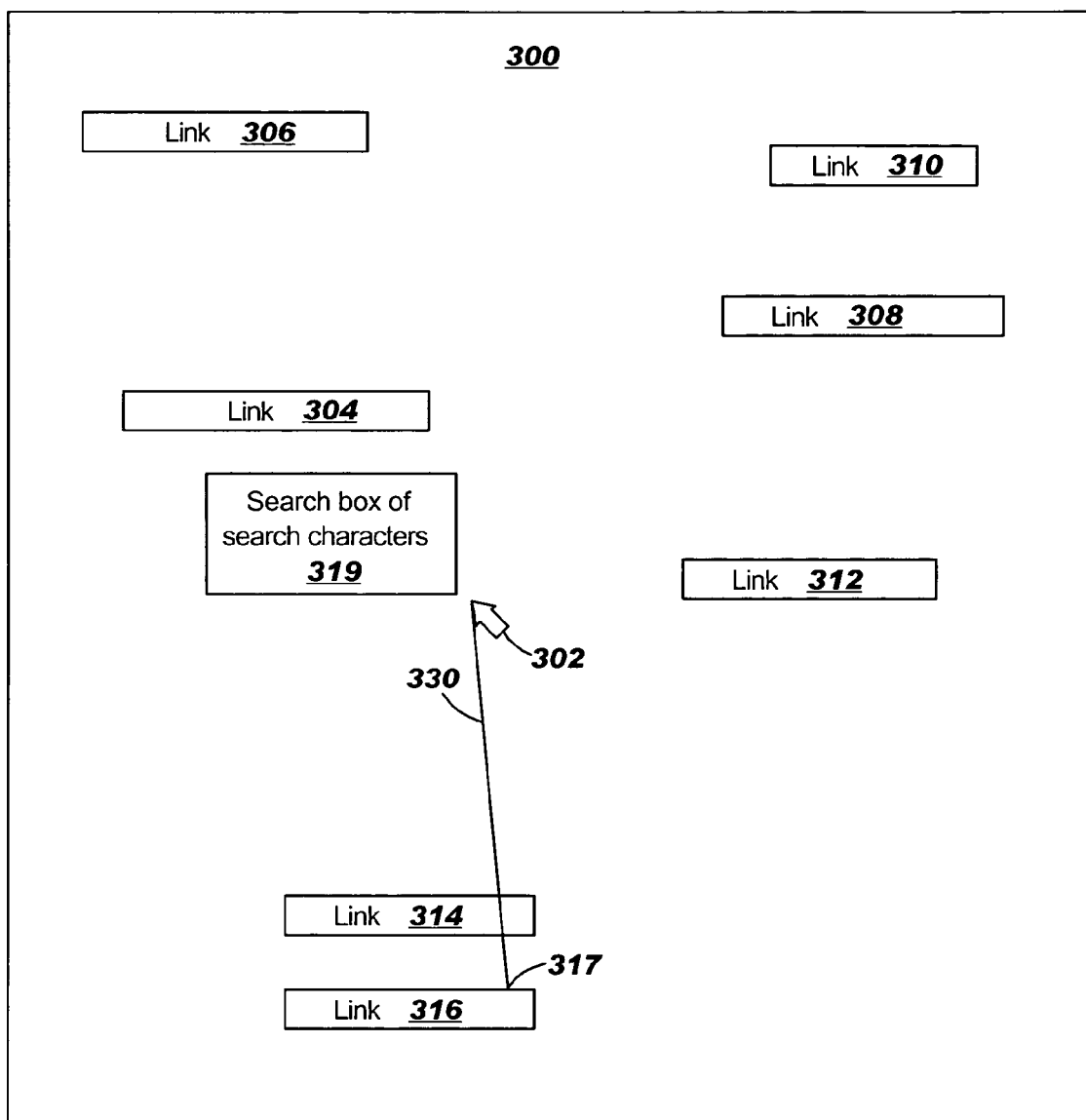
FIG. 9 is a pictorial representation of a web page that includes an enhanced mouse pointer that points to a seventh link in accordance with the present invention.

For example, FIG. 9 is a pictorial representation of a web page that includes an enhanced mouse pointer that points to a seventh link 316 in accordance with the present invention. Link 316 was determined to be the next closest link in a radial direction from link 314. Therefore, link 316 is the next link highlighted as the scroll wheel is moved. In addition, a line 330 is drawn from the tip of enhanced mouse pointer 302 to link 316. If, instead of selecting link 316, the user continues to rotate the scroll wheel, the next closest link in a radial direction from link 316 will be highlighted.

As described above, as the scroll wheel is moved, the enhanced mouse pointer remains stationary while each link the web page is highlighted, one at a time. The user may select the highlighted link, or continue to rotate the scroll wheel in order to cause other links in the page to be highlighted. If the user selects the highlighted link, the user traverses that link to the link's destination location.

The links in the page are highlighted, one at a time, as the user moves the scroll wheel up and down. Thus, the links are selected in a radial positive direction (as in the examples described above) or radial negative direction from the currently highlighted link depended on whether the scroll wheel was moved up or down.

Figure 10:
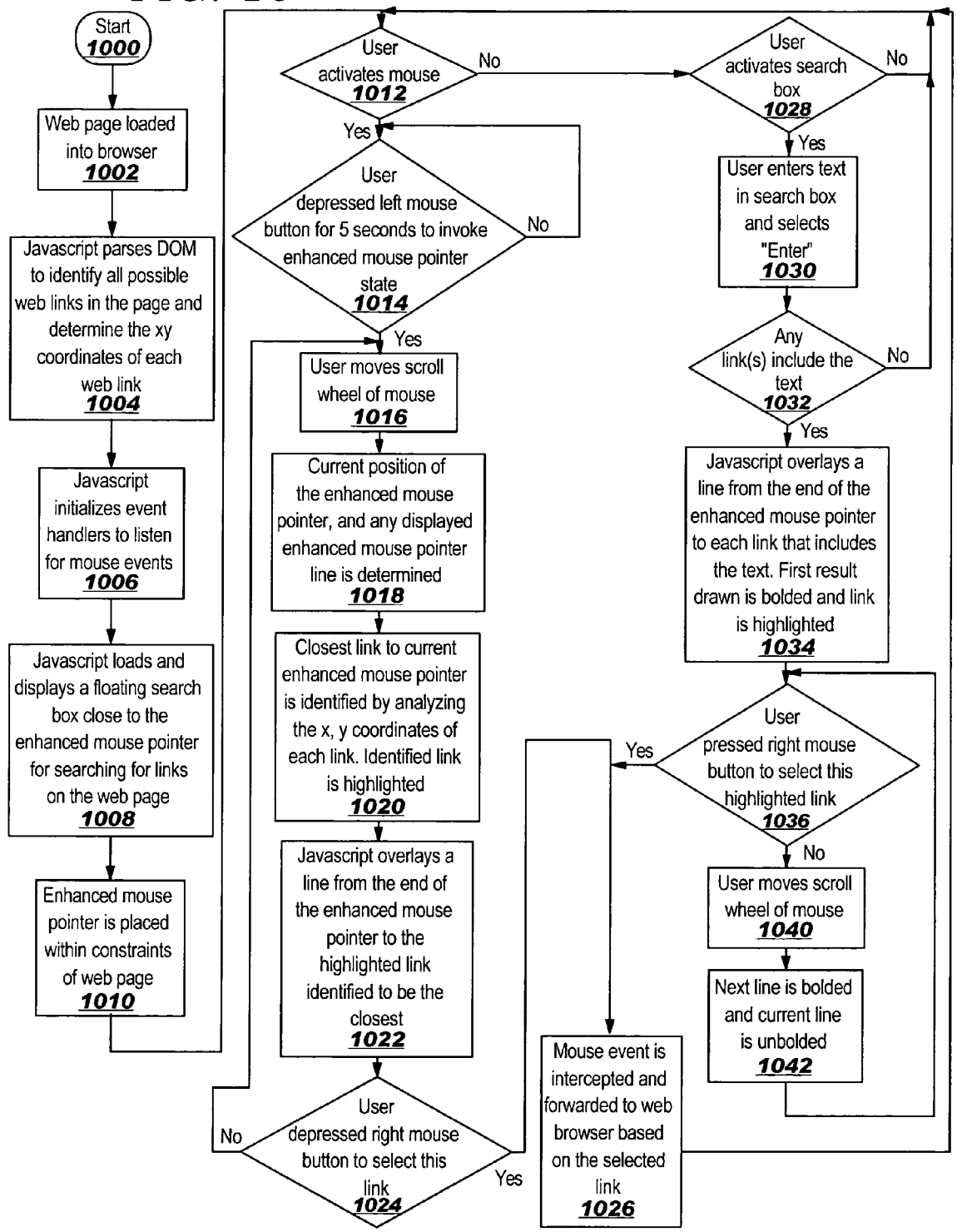
FIG. 10 depicts a high level flow chart that illustrates an enhanced mouse pointer that permits a user to select a link or scroll through links while the mouse remains stationary on the desk surface on which the mouse rests in accordance with the present invention.

FIG. 10 depicts a high level flow chart that illustrates an enhanced mouse pointer that permits a user to select a link or scroll through links without physically moving the mouse in accordance with the present invention. The process starts as depicted by block 1000 and thereafter passes to block 1002 which illustrates a web page being loaded into a browser. Next, block 1004 depicts Javascript parsing the Document Object Model (DOM) to identify all possible web links in the page as well as to determine the x,y coordinates of each identified web link. The DOM is a language neutral interface that describes a model of how objects are put together and defines a standard for accessing these objects.

The process then passes to block 1006 which illustrates Javascript initializes event handlers to listen for mouse events. Thereafter, block 1008 depicts Javascript loading and displaying a floating search box close to the enhanced mouse pointer for searching for web links on the web page. Next, block 1010 illustrates the enhanced mouse pointer being placed within the constraints of the web page.

Thereafter, block 1012 depicts a determination of whether or not the user has activated the mouse. If a determination is made that the user has activated the mouse, the process passes to block 1014 which illustrates a determination of whether or not the user depressed the left mouse button for five seconds in order to invoke the enhanced mouse pointer state. If a determination is made that the user has not depressed the left mouse button for five seconds, the process passes back to block 1014. If a determination is made that the user has depressed the left mouse button for five seconds, the enhanced mouse pointer state has been invoked and the process passes to block 1016.

Block 1016 depicts the user moving the scroll wheel of the mouse. Next, block 1018 illustrates the current position of the enhanced mouse pointer and any enhanced mouse pointer line being determined. The process then passes to block 1020 which depicts the closest link to the current enhanced mouse pointer being identified by analyzing the x,y coordinates of each link. Thereafter, block 1022 illustrates Javascript overlaying an enhanced mouse pointer line from the end of the enhanced mouse pointer to the highlighted link that was identified as being the closest link.

Block 1024, then, depicts a determination of whether the user depressed the right mouse button to select this highlighted link. If a determination is made that the user did not depress the right mouse button to select this highlighted link, the process passes back to block 1016. If a determination is made that the user did depress the right mouse button to select this highlighted link, the process passes to block 1026 which depicts the mouse event being intercepted and forwarded to the web browser based on the selected link. At this time the enhanced mouse pointer state has been exited. The process then passes back to block 1012.

Referring again to block 1012, if a determination is made that the user has not activated the mouse, the process passes to block 1028 which depicts a determination of whether or not the user has activated the search box. If a determination is made that the user has not activated the search box, the process passes back to block 1012. Referring again to block 1012, if a determination is made that the user has activated the search box, the process passes to block 1030 which illustrates the user entering text in the search box and selecting "enter".

Next, block 1032 depicts a determination of whether or not any link(s) include the text. If a determination is made that no link includes the text, the process passes back to block 1012. If a determination is made that one or more links include the text, the process passes to block 1034 which depicts Javascript overlaying an enhanced mouse pointer line from the end of the enhanced mouse pointer to each link that includes the text. The line that is drawn to the first result is bolded. The link to which the first line is drawn is highlighted.

Block 1036, then, illustrates a determination of whether or not the user depressed the right mouse button to exit the enhanced mouse pointer state and select the highlighted link. If a determination is made that the user did depress the right mouse button, the process passes back to block 1026. If a determination is made that the user did not depress the right mouse button, the process passes to block 1040 which depicts the user moving the scroll wheel of the mouse. Next, block 1042 illustrates the next line being bolded and the current line being un-bolded. The link to which the next line points is then highlighted and the link to which the current line pointed is un-highlighted. The process then passes to block 1036.

Figure 11:
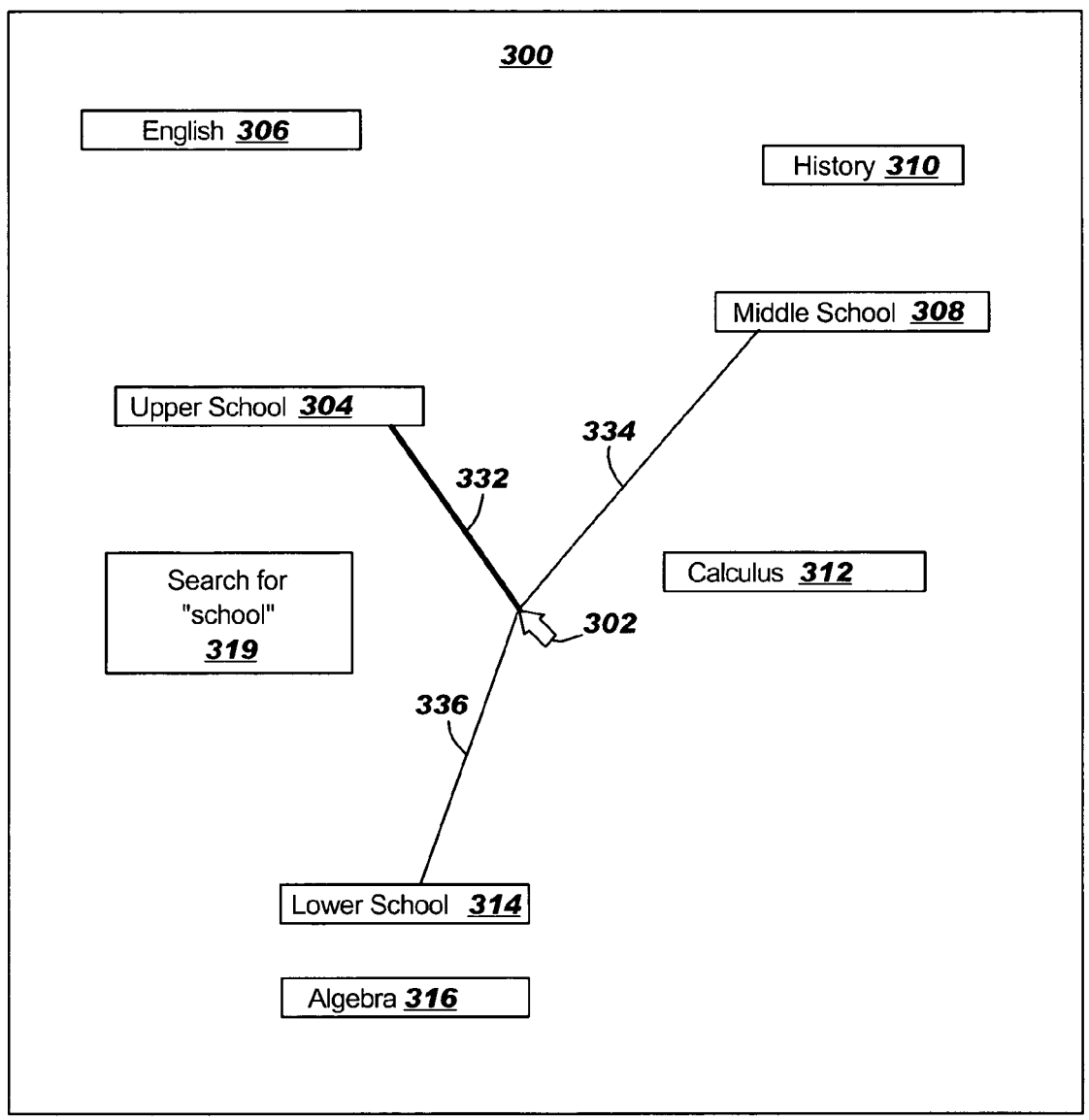
FIG. 11 is a pictorial representation of a web page that includes an enhanced mouse pointer that includes a search box for simultaneously locating multiple links which include the text for which a search was performed in accordance with the present invention.

FIG. 11 is a pictorial representation of a web page 300 that includes an enhanced mouse pointer 302 that includes a search box 319 for simultaneously locating multiple links which include the text for which a search was performed in accordance with the present invention.

A user may enter text into search box 319. The present invention then searches the text of each link in the web page 300 in order to attempt to locate the text. If one or more links include the text for which the search was performed, the present invention automatically displays a line to each one of those links. The first link that was located that included the text is highlighted such that if the user were to exit the enhanced mouse pointer state by depressing the right mouse button, the highlighted link would be selected.

The example depicted in FIG. 11 illustrates three links, link 304, 308, and 314, that included the text "school" for which the search was performed. A line is drawn from enhanced mouse pointer 302 to each identified link. A line 332 is drawn to link 304. A line 334 is drawn to link 308. And, a line 336 is drawn to link 314.

Link 304 was the first link that was located that included the text. Therefore, link 304 is highlighted. Link 304 is further indicated as being the highlighted link by a line 332 being darker than lines 334 and 336.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for selecting links in a page in a data processing system using an enhanced mouse pointer, said data processing system including a mouse that includes a scroll wheel, said method comprising:
    identifying a plurality of links in said page;
    displaying a standard mouse pointer, associated with said mouse, in said page to form a displayed standard mouse pointer;
    invoking an enhanced mouse pointer state causing said displayed standard mouse pointer to form a displayed enhanced mouse pointer, wherein said displayed enhanced mouse pointer has a tail and a distal tip;
    in response to said invoking said enhanced mouse pointer state, determining a physically closest one of said plurality of links in said page to said displayed enhanced mouse pointer;
    displaying an enhanced mouse pointer indicator that extends from said tip of said displayed enhanced mouse pointer to said determined physically closest one of said plurality of links; and
    scrolling through said plurality of links sequentially, without moving said mouse, wherein said enhanced mouse pointer indicator moves to each link in said plurality of links in response to a rotation of said scroll wheel.

2. The method according to claim 1, further comprising:
    receiving a predetermined amount of a rotation of said scroll wheel at a time;
    moving said enhanced mouse pointer indicator as said scroll wheel is rotated; and
    said enhanced mouse pointer indicator extending from said tip of said enhanced mouse pointer to a next physically closest one of said plurality of links as said scroll wheel is rotated each predetermined amount.

3. The method according to claim 1, further comprising:
    highlighting said determined physically closest one of said plurality of links;
    selecting said highlighted physically closest one of said plurality of links; and
    traversing to a destination location associated with said selected one of said plurality of links when said physically closest one of said plurality of links is selected.

4. The method according to claim 3, further comprising:
    invoking an enhanced mouse pointer state causing said displayed standard mouse pointer to become said displayed enhanced mouse pointer in response to a constant depression of a first mouse button included in said mouse for a predetermined amount of time.

5. The method according to claim 4, further comprising:
    selecting said highlighted physically closest one of said plurality of links while said mouse remains stationary in response to a depression of a second mouse button included in said mouse; and
    exiting said enhanced mouse pointer state in response to said depression of said second mouse button.

6. The method according to claim 1, further comprising:
    displaying a search box next to said displayed enhanced mouse pointer;
    receiving search text in said search box;
    searching each one of said plurality of links for said search text; and
    in response to locating at least one of said plurality of links that include said search text, forming a located at least one of said plurality of links and displaying an enhanced mouse pointer indicator that extends from said tip of said enhanced mouse pointer to said located at least one of said plurality of links.

7. The method according to claim 6, further comprising:
    in response to locating a first plurality of said plurality of links that include said search text, simultaneously displaying a plurality of enhanced mouse pointer indicators, a separate enhanced mouse pointer indicator being displayed that extends from said tip of said enhanced mouse pointer to each one of said plurality of links.

8. The method according to claim 1, further comprising:
    said displayed enhanced mouse pointer remaining stationary on said page once said enhanced mouse pointer state is invoked; and movement of said mouse on a surface on which said mouse rests not affecting said enhanced mouse pointer.

9. The method according to claim 1, further comprising:
said mouse not being required to be moved on a surface on which said mouse rests in order to scroll through said plurality of links.

10. The method according to claim 1, further comprising:
highlighting said determined physically closest one of said plurality of links, selecting said highlighted physically closest one of said plurality of links, and traversing to a destination location associated with said selected one of said plurality of links when said physically closest one of said plurality of links is selected without moving said mouse on a surface on which said mouse rests.

11. An apparatus for selecting links in a page in a data processing system using an enhanced mouse pointer, said data processing system including a CPU and a mouse that includes a scroll wheel, said apparatus comprising:
a plurality of links in said page;
a standard mouse pointer, associated with said mouse, displayed in said page, to form a displayed standard mouse pointer;
an enhanced mouse pointer state being invoked causing said displayed standard mouse pointer to form a displayed enhanced mouse pointer, wherein said displayed enhanced mouse pointer has a tail and a distal tip;
in response to said invoking said enhanced mouse pointer state, said CPU executing code for determining a physically closest one of said plurality of links in said page to said displayed enhanced mouse pointer;
said CPU executing code for displaying an enhanced mouse pointer indicator that extends from said tip of said displayed enhanced mouse pointer to said determined physically closest one of said plurality of links; and
said scroll wheel for scrolling through said plurality of links sequentially, without moving said mouse, wherein said enhanced mouse pointer indicator moves to each link in said plurality of links in response to a rotation of said scroll wheel.

12. The apparatus according to claim 11, further comprising:
said CPU executing code for receiving a predetermined amount of rotation of said scroll wheel at a time;
said enhanced mouse pointer indicator being moved as said scroll wheel is rotated; and
said enhanced mouse pointer indicator extending from said tip of said enhanced mouse pointer to a next physically closest one of said plurality of links as said scroll wheel is rotated each predetermined amount.

13. The apparatus according to claim 11, further comprising:
said CPU executing code for highlighting said determined physically closest one of said plurality of links;
said CPU executing code for selecting said highlighted physically closest one of said plurality of links; and
said CPU executing code for traversing to a destination location associated with said selected one of said plurality of links when said physically closest one of said plurality of links is selected.

14. The apparatus according to claim 13, further comprising:
an enhanced mouse pointer state being invoked causing said displayed standard mouse pointer to become said displayed enhanced mouse pointer in response to a constant depression of a first mouse button included in said mouse for a predetermined amount of time.

15. The apparatus according to claim 14, further comprising:
said CPU executing code for selecting said highlighted physically closest one of said plurality of links while said mouse remains stationary in response to a depression of a second mouse button included in said mouse; and
said CPU executing code for exiting said enhanced mouse pointer state in response to said depression of said second mouse button.

16. The apparatus according to claim 11, further comprising:
a search box displayed next to said displayed enhanced mouse pointer;
search text received in said search box;
said CPU executing code for searching each one of said plurality of links for said search text; and
in response to locating at least one of said plurality of links that include said search text, forming a located at least one of said plurality of links, said CPU executing code for displaying an enhanced mouse pointer indicator that extends from said tip of said enhanced mouse pointer to said located at least one of said plurality of links.

17. The apparatus according to claim 16, further comprising:
in response to locating a first plurality of said plurality of links that include said search text, said CPU executing code for simultaneously displaying a plurality of enhanced mouse pointer indicators, a separate enhanced mouse pointer indicator being displayed that extends from said tip of said enhanced mouse pointer to each one of said plurality of links.

18. The apparatus according to claim 11, further comprising:
said displayed enhanced mouse pointer remaining stationary on said page once said enhanced mouse pointer state is invoked; and
movement of said mouse on a surface on which said mouse rests not affecting said displayed enhanced mouse pointer.

19. The apparatus according to claim 11, further comprising:
said mouse not being required to be moved on a surface on which said mouse rests in order to scroll through said plurality of links.

20. The apparatus according to claim 11, further comprising:
said CPU executing code for highlighting said determined physically closest one of said plurality of links, selecting said highlighted physically closest one of said plurality of links, and traversing to a destination location associated with said selected one of said plurality of links when said physically closest one of said plurality of links is selected without moving said mouse on a surface on which said mouse rests.

21. A program product stored on a computer readable medium for selecting links in a page in a data processing system using an enhanced mouse pointer, said data processing system including a mouse that includes a scroll wheel managing device identifiers, which when executed by a computer performs the following steps:
identifying a plurality of links in said page;
displaying a standard mouse pointer, associated with said mouse, in said page to form a displayed standard mouse pointer;
invoking an enhanced mouse pointer state causing said displayed standard mouse pointer to form a displayed enhanced mouse pointer, wherein said displayed enhanced mouse pointer has a tail and a distal tip;

in response to said invoking said enhanced mouse pointer state, determining a physically closest one of said plurality of links in said page to said displayed enhanced mouse pointer;

displaying an enhanced mouse pointer indicator that extends from said tip of said displayed enhanced mouse pointer to said determined physically closest one of said plurality of links; and scrolling through said plurality of links sequentially, without moving said mouse, wherein said enhanced mouse pointer indicator moves to each link in said plurality of links in response to a rotation of said scroll wheel.

22. The program product according to claim 21, further comprising:

receiving a predetermined amount of a rotation of said scroll wheel at a time;

moving said enhanced mouse pointer indicator as said scroll wheel is rotated; and said enhanced mouse pointer indicator extending from said tip of said enhanced mouse pointer to a next physically closest one of said plurality of links as said scroll wheel is rotated each predetermined amount.

23. The program product according to claim 21, further comprising:

highlighting said determined physically closest one of said plurality of links;

selecting said highlighted physically closest one of said plurality of links; and traversing to a destination location associated with said selected one of said plurality of links when said physically closest one of said plurality of links is selected.

24. The program product according to claim 23, further comprising:

invoking an enhanced mouse pointer state causing said displayed standard mouse pointer to become said displayed enhanced mouse pointer in response to a constant depression of a first mouse button included in said mouse for a predetermined amount of time.

25. The program product according to claim 24, further comprising:

selecting said highlighted physically closest one of said plurality of links while said mouse remains stationary in response to a depression of a second mouse button included in said mouse; and exiting said enhanced mouse pointer state in response to said depression of said second mouse button.

26. The program product according to claim 21, further comprising:

displaying a search box next to said displayed enhanced mouse pointer;

receiving search text in said search box;

searching each one of said plurality of links for said search text; and in response to locating at least one of said plurality of links that include said search text, forming a located at least one of said plurality of links and displaying an enhanced mouse pointer indicator that extends from said tip of said enhanced mouse pointer to said located at least one of said plurality of links.

27. The program product according to claim 26, further comprising:

in response to locating a first plurality of said plurality of links that include said search text, simultaneously displaying a plurality of enhanced mouse pointer indicators, a separate enhanced mouse pointer indicator being displayed that extends from said tip of said enhanced mouse pointer to each one of said plurality of links.

28. The program product according to claim 21, further comprising:

said displayed enhanced mouse pointer remaining stationary on said page once said enhanced mouse pointer state is invoked; and movement of said mouse on a surface on which said mouse rests not affecting said enhanced mouse pointer.

29. The program product according to claim 21, further comprising:

said mouse not being required to be moved on a surface on which said mouse rests in order to scroll through said plurality of links.

30. The program product according to claim 21, further comprising:

highlighting said determined physically closest one of said plurality of links, selecting said highlighted physically closest one of said plurality of links, and traversing to a destination location associated with said selected one of said plurality of links when said physically closest one of said plurality of links is selected without moving said mouse on a surface on which said mouse rests.

* * * * *

UNITED STATES PATENT AND TRADEMARK OFFICE
CERTIFICATE OF CORRECTION

PATENT NO. : 7,647,565 B2  Page 1 of 1
APPLICATION NO. : 11/059722
DATED : January 12, 2010
INVENTOR(S) : Hayes, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this

Sixteenth Day of November, 2010

David J. Kappos
*Director of the United States Patent and Trademark Office*